US012500052B2

(12) United States Patent
Desai et al.

(10) Patent No.: US 12,500,052 B2
(45) Date of Patent: Dec. 16, 2025

(54) OPERATING MECHANISM FOR CIRCUIT BREAKERS

(71) Applicant: Hitachi Energy Ltd, Zurich (CH)

(72) Inventors: Dhairyshil Ramchandra Desai, Vadodara (IN); Vikaskumar Thakur, Surat (IN); Deepak Verma, Delhi (IN); Prashant Zatale, Nagpur (IN)

(73) Assignee: Hitachi Energy Ltd, Zürich (CH)

( * ) Notice: Subject to any disclaimer, the term of this patent is extended or adjusted under 35 U.S.C. 154(b) by 223 days.

(21) Appl. No.: 18/278,438

(22) PCT Filed: Feb. 23, 2022

(86) PCT No.: PCT/EP2022/054484
§ 371 (c)(1),
(2) Date: Aug. 23, 2023

(87) PCT Pub. No.: WO2022/180074
PCT Pub. Date: Sep. 1, 2022

(65) Prior Publication Data

US 2024/0145192 A1 May 2, 2024

(30) Foreign Application Priority Data

Feb. 24, 2021 (IN) ............................ 202121007882

(51) Int. Cl.
*H01H 33/42* (2006.01)
*H01H 3/60* (2006.01)

(52) U.S. Cl.
CPC ............ *H01H 33/42* (2013.01); *H01H 3/605* (2013.01)

(58) Field of Classification Search
CPC ........ H01H 33/42; H01H 33/62; H01H 33/64; H01H 33/40; H01H 33/91; H01H 33/901;
(Continued)

(56) References Cited

U.S. PATENT DOCUMENTS 5,059,753 A 10/1991 Hamm
5,571,255 A * 11/1996 Baginski .................. H01H 3/60 200/400

(Continued)

FOREIGN PATENT DOCUMENTS

WO 2018036737 A1 3/2018

OTHER PUBLICATIONS

International Search Report and Written Opinion of the International Searching Authority, PCT/EP2022/054484, mailed Feb. 23, 2022, 8 pages.

*Primary Examiner* — William A Bolton
(74) *Attorney, Agent, or Firm* — Sage Patent Group

(57) ABSTRACT

Examples of an operating mechanism of a circuit breaker are described. The operating mechanism includes a housing, a cam element installed on a mechanically driven first shaft, a transmission lever installed on a second shaft parallel to the first shaft, and a support assembly. The transmission lever is provided with a first roller element. The support assembly includes a fork joint that is to support a second roller element and a damper element coupled to the fork joint. During a closing operation of the circuit breaker, the cam element rotates to interact with the first roller element to cause rotation of the transmission lever to close the circuit breaker and rotates further to engage with the second roller element on the fork joint to initiate a closing damper stroke.

19 Claims, 6 Drawing Sheets

(58) Field of Classification Search

CPC ........ H01H 3/605; H01H 3/3015; H01H 3/42; H01H 2033/888; H01H 1/385; H01B 17/26

USPC ........ 218/154, 153, 140, 120; 200/6 B, 19.2, 200/416, 436, 533, 551, 324

See application file for complete search history.

(56) References Cited

U.S. PATENT DOCUMENTS

| | | | | |
|---|---|---|---|---|
| 8,664,556 | B2 * | 3/2014 | Yamamoto | H01H 3/3031 200/469 |
| 9,472,359 | B2 * | 10/2016 | Ding | H01H 9/24 |
| 9,530,578 | B2 * | 12/2016 | Chen | H01H 3/3026 |
| 10,276,315 | B2 * | 4/2019 | Tanigaki | H01H 3/04 |
| 2010/0126967 | A1 | 5/2010 | Ohda et al. | |
| 2013/0153384 | A1 * | 6/2013 | Ricciuti | F16H 53/025 74/567 |
| 2017/0047181 | A1 * | 2/2017 | Yang | H01H 3/3005 |
| 2018/0068806 | A1 * | 3/2018 | Gottschalk | H01H 3/3052 |

* cited by examiner

OPERATING MECHANISM FOR CIRCUIT BREAKERS

CROSS REFERENCE TO RELATED APPLICATIONS

This application is a 35 U.S.C. § 371 national stage application of PCT International Application No. PCT/EP2022/054484 filed on Feb. 23, 2022, which in turn claims priority to Indian Patent Application No. 202121007882, filed on Feb. 24, 2021, the disclosures and content of which are incorporated by reference herein in their entireties.

TECHNICAL FIELD

The present subject matter relates, in general, to power systems. More specifically, the present subject matter relates to an operating mechanism of circuit breakers in the power systems.

BACKGROUND

Electrical fault occurring in a power line of an electrical power system may be caused due to a number of factors, which include equipment failures, overload, short circuit, or environmental conditions. The electrical fault may be hazardous and, in some cases, life-threatening. Therefore, clearing of electrical fault is critical to ensure safe operation of the electrical power system. Protection systems, for example, an Intelligent Electronic Device (IED), logic circuit(s), sensor(s), relay(s) and circuit breaker(s), may be utilized to provide protection to the electrical power system against the electrical fault.

During the electrical fault, a circuit breaker may interrupt power flow in the power line, hence preventing further damage to the power line and/or equipment associated with the power line. Further, for clearing short circuit electrical faults and for out-of-phase switching operations, SF6 gas circuit breaker of self-blast design may be used for low-current as well as high-current interruptions. The SF6 gas circuit breaker of self-blast design, commercially available as Live Tank circuit breakers (LTB), may be provided with arc-assisted interrupters.

BRIEF DESCRIPTION OF DRAWINGS

The features, aspects, and advantages of the present subject matter will be better understood with regards to the following description and accompanying figures. The use of the same reference number in different figures indicate similar or identical features and components.

Figure 1:
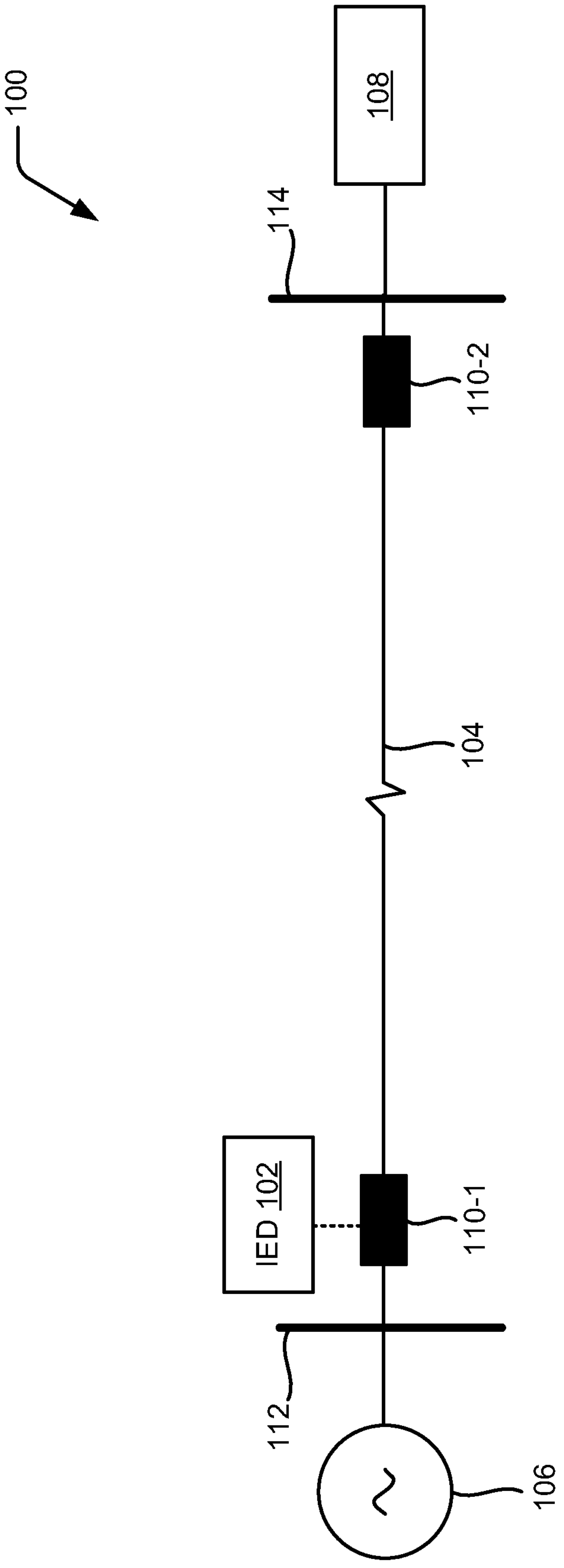
FIG. 1 illustrates a power system having an intelligent electronic device, as per an example.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

Protection systems that include logic circuits, sensors, relays, circuit breakers, fuses, isolators, instrument transformers, and other protection devices, are provided in the power systems to control, protect and isolate electrical equipment of the electrical power systems during any electrical fault. An electrical fault may correspond to an abnormal condition in an electrical power system which may damage electrical equipment and disturb normal flow of electric current in the electrical power system. The electrical fault may occur in one or more of the three phases or a power line of the power system.

During an electrical fault, an Intelligent Electronic Device (IED) provided in the electrical power system may sense occurrence of an electrical fault. Thereafter, the IED may cause operation of a circuit breaker to protect an electrical circuit from damage that may be caused due to the electrical fault. For example, the electrical fault may occur due to an overload or a short circuit in a power line in the power system. In response to detection of the electrical fault by the IED, the circuit breaker may interrupt current flow in the power line. Once the electrical fault is cleared, the circuit breaker may be reset or closed to resume normal operation of the power line and the power system, either manually or automatically. To this end, sufficient mechanical power may be required during an opening operation and a closing operation of the circuit breaker to move a moving contact with respect to a fixed contact. Moreover, dielectric medium may be ejected between the contacts to neutralize arcing.

In one example, the circuit breaker may be a SF6 type circuit breaker having self-blast design, referred to as Live Tank Breaker (LTB). Moreover, mechanical energy for moving the moving contact for opening and closing the LTB may be provided by an operating mechanism, such as a spring operating mechanism. The spring operating mechanism may have potential energy mechanically stored in springs, in particular, opening spring and closing spring. The opening spring and the closing spring may initiate the opening operation and the closing operation, respectively, in the LTB. For example, different spring operating mechanisms, such as BLK, BLG, MSD, and FSA, may be used based on a rating of the power line to be isolated or a rating of the LTB.

During the closing operation, the closing spring may be released to engage the moving contact with the fixed contact. When the closing spring is released, it charges the opening spring, wherein an opening latch holds the opening spring in compressed position until an opening signal releases the opening latch during a next opening operation of the circuit breaker. In addition, the closing spring is then immediately mechanically charged and is held in its compressed position by a closing latch, until next operation. To this end, potential energy stored in the closing spring may be converted to kinetic energy during the release of the closing spring. This kinetic energy moves or rotates the moving contact to close the circuit breaker.

During the release of the closing spring, the closing spring may bounce resulting in repulsive forces. Although, a closing spring associated with LTB operating at low rating, such as below 170 kV, may operate with low speed and at low energy. Therefore, such closing spring may bear small repulsive force that may be overcome by the closing spring itself in order to bring the closing spring to rest.

However, a closing spring associated with LTB operating at high rating, may operate with high speed and at high energy. Due to high operating speed and owing to quick operations of the closing spring, such a closing spring may be subjected to high mechanical stress. Consequently, the closing spring may fail to overcome repulsive forces effectively. As a result, the closing spring may operate at high working torque that may affect mechanical endurance of the closing spring. Due to this, a number of operations or performance of the closing spring may reduce. Therefore, number of maintenance cycles for the circuit breaker may increase and reliability of the circuit breaker may decrease.

Approaches for providing an operating mechanism for a circuit breaker are described. Circuit breakers may be provided on power lines in a power system. In an example, the circuit breakers may be controlled or operated by a logic circuit or an Intelligent Electronic Device (IED). For example, an IED may trigger a circuit breaker for operation, upon sensing an electrical fault in the power system. When the electrical fault occurs in one or more phase (referred as, faulty power line) of the power system, the circuit breaker may be operated to isolate the faulty power line. The circuit breakers may isolate the faulty power line until the clearance of the electrical fault. Once the electrical fault is cleared, the circuit breaker may be closed for continuing normal operation of the power system.

As would be understood, an arc may be generated during an opening operation of the circuit breaker. Subsequently, the circuit breaker may employ an extinguishing medium, such as oil, air, vacuum, or sulphur hexafluoride (SF6) gas, to cool and quench the arc on opening the power line. In one example, the circuit breaker may be a self-blast type SF6 circuit breaker (referred to as, Live Tank Breaker (LTB)). In such a case, the LTB may have self-blast chambers for expansion volume and compression volume of extinguishing medium (SF6) separated by a valve. As would be understood, when the LTB operates at low rating, the valve may open due to overpressure generated in the compression volume of SF6 by an arc. Moreover, when the LTB operates at high rating, the valve may close due to overpressure generated in the expansion volume of SF6 by an arc.

The operating mechanism of a circuit breaker may include a housing. The housing may form an enclosure for components of the circuit breaker. Further, the operating mechanism of the circuit breaker may include a mechanically driven first shaft. For example, the first shaft may be a longitudinal tubular rotating element. The first shaft may be inserted within the housing, such as along an axial axis of the housing. The first shaft may be connected to a closing spring system of the circuit breaker.

The operating mechanism may include a cam element positioned within the housing. The cam element may be installed on the first shaft. The cam element may form a movable mechanical linkage. In an example, the cam element may have a flat body extending perpendicular to a longitudinal axis of the first shaft. In particular, a first end of the cam element may be connected to the first shaft, whereas a second end of the cam element may be connectable to other component of the circuit breaker.

Continuing further, the operating mechanism may include a transmission lever. The transmission lever may be installed on a second shaft within the housing. In an example, the second shaft may be positioned along an axial axis of the housing, parallel to the first shaft and within same axial plane as the first shaft. Moreover, the transmission lever may be provided with a first roller element. In an example, the first roller element may be a ball bearing.

The operating mechanism further includes a support assembly coupled to an inner surface of a vertical wall of the housing. The support assembly includes a fork joint having a moveable end and a pivoted end. The pivoted end of the fork joint is rigidly attached to the inner surface of the vertical wall of the housing. The movable end of the fork joint may include three prongs forming a first slot and a second slot. Moreover, the first slot of the fork joint is to rotatably secure a second roller element. In an example, the second roller element is a ball bearing.

The support assembly further includes a damper element. The damper element has a first end and a second end opposite to the first end. The first end of the damper element is rigidly pivoted on an upper horizontal surface of the housing of the circuit breaker. Moreover, the second end of the damper element is coupled to the moveable end of the fork joint. In an example, the damper element is a damper cylinder. For example, the first end may be rigidly pivoted to the upper horizontal surface of the housing via a damper spring. Further, the second end of the damper element may be movably secured within the second slot of the fork joint.

During a closing operation of the circuit breaker, a closing spring system of the circuit breaker may be released to initiate the closing operation of the circuit breaker. The closing spring may drive the cam element such that the cam element may engage with the first roller element on the transmission lever. The transmission lever is attached to the second shaft, which in turn is attached to the moving contact of the circuit breaker. The cam element may then apply mechanical force on the transmission lever to close the circuit breaker. In this manner, the transmission lever is rotated or pushed thereby closing the circuit breaker. In one example, the transmission lever may be held in closed position by a trip latch.

Furthermore, during the closing operation, the cam element on the first shaft may disengage from the first roller element on the transmission lever. Once the cam element loses contact with the first roller element, it may be rotated further to engage with the second roller element on the fork joint to initiate a closing damper stroke. In this regard, a total energy to be absorbed by the support assembly to provide damper is dependent on a stroke length of the closing spring. As may be understood, the stroke length is a distance between a compressed and an extended length of the closing spring. In particular, the stroke length is based on distance from resting position in one state (e.g., compressed) to the resting position in the other state (e.g., expanded).

Pursuant to the present subject matter, the support assembly provides damping force to the circuit breaker. In particular, as the cam element interacts with the second roller element on the fork joint, the damper element is brought in contact with the fork joint. In operation, the damper element may absorb the energy released when the cam element loses contact or disengages with the first roller element and cause restricted flow of a damping fluid during the closing damper stroke. Due to the absorption of the energy by the support assembly, the closing spring may not have to undergo high working torque to provide damping to the circuit breaker.

The operating mechanism described in the present subject matter improves the robustness of the circuit breaker, when operating at high speed and in case of high energy application. The operating mechanism, specifically, the support assembly, fits within constricted conventional housing of the circuit breaker. Therefore, robustness of the circuit breaker is improved without increasing an overall size of the circuit breaker. The support assembly operates to provide damping to the cam element. To this end, no physical contact is present between the cam element and the second roller element of the support assembly. It may be understood that the operating mechanism described herein provides higher order kinematics at the contacts between the cam element and the second roller element. This also ensures that less space is occupied by the support assembly for providing damping action.

In addition, the second roller element of the support assembly is brought in contact with the cam element after the cam element loses contact with the first transmission lever. This prevents any effect of the operation of the support assembly on the speed or travel characteristics of the circuit breaker or the cam element. Moreover, the support assembly provides damping to the circuit breaker and brings the closing spring slowly to rest. In particular, the support assembly absorbs energy or excess repulsive force released by the closing spring so as to prevent any interference to closing travel characteristics of the cam element. The slow deceleration of the closing spring results in low stress on the closing spring due to the high energy for moving the cam element. To this end, potential energy of the closing spring may not need to be increased for high speed operation of the circuit breaker. The present subject matter is now described in conjunction with FIGS. 1-7.

FIG. 1 illustrates a power system 100 having an intelligent electronic device 102, as per an example. Although not depicted, the power system 100 may further include additional electrical components such as lightning arrestors, step-up transformers, converters, step-down transformers, measuring equipment (for example, sensors, current transformers and potential transformers), insulators, switching stations, sub-transmission substations, distribution substations, and constructional structures (for example, poles and towers). The power system 100 is shown to have a power line 104. It may be noted that the power line 104 may correspond to a phase, such as 'R', 'Y', or 'B' phase, or a DC power line. It may be noted that the power transmission system 100 may also comprise one or more neutral lines.

The power line 104 within the power system 100 may further be coupled to an electrical power source 106 and a load 108. The power line 104 may further be provided with one or more circuit breaker(s), namely circuit breakers 110-1 and 110-2 (collectively referred to as circuit breaker(s) 110). The power system 100 includes two power busses 112 and 114 that serves as electrical junctions, and the power line 104 may be used for transmission of electric power from the power sources 106 to the load 108.

The IED 102 associated with the power line 104 may be in electrical communication with the power line 104 and the circuit breaker, either directly or through other connecting means. In one example, the IED 102 may be provided at local terminal of the power line 104. In another example, the IED 102 may be located at a remote location and may further be connected with measuring equipment at local terminals of the power line 104. The IED 102 may include a fault detection mechanism to detect fault in the power line 104. In one example, the IED may detect the fault based on current and voltage measurements of the power line 104.

On detecting a fault in the power line 104, the IED may trigger the circuit breaker(s) 110. The circuit breaker(s) 110 operates to, for example, control opening and/or closing of a circuit (specifically, the power line 104) to control flow of current through the circuit. As would be understood, the circuit breaker(s) 110 may be provided at terminals of the power line 104 for de-energization of faulty circuit or the faulty power line 104.

Figure 2:
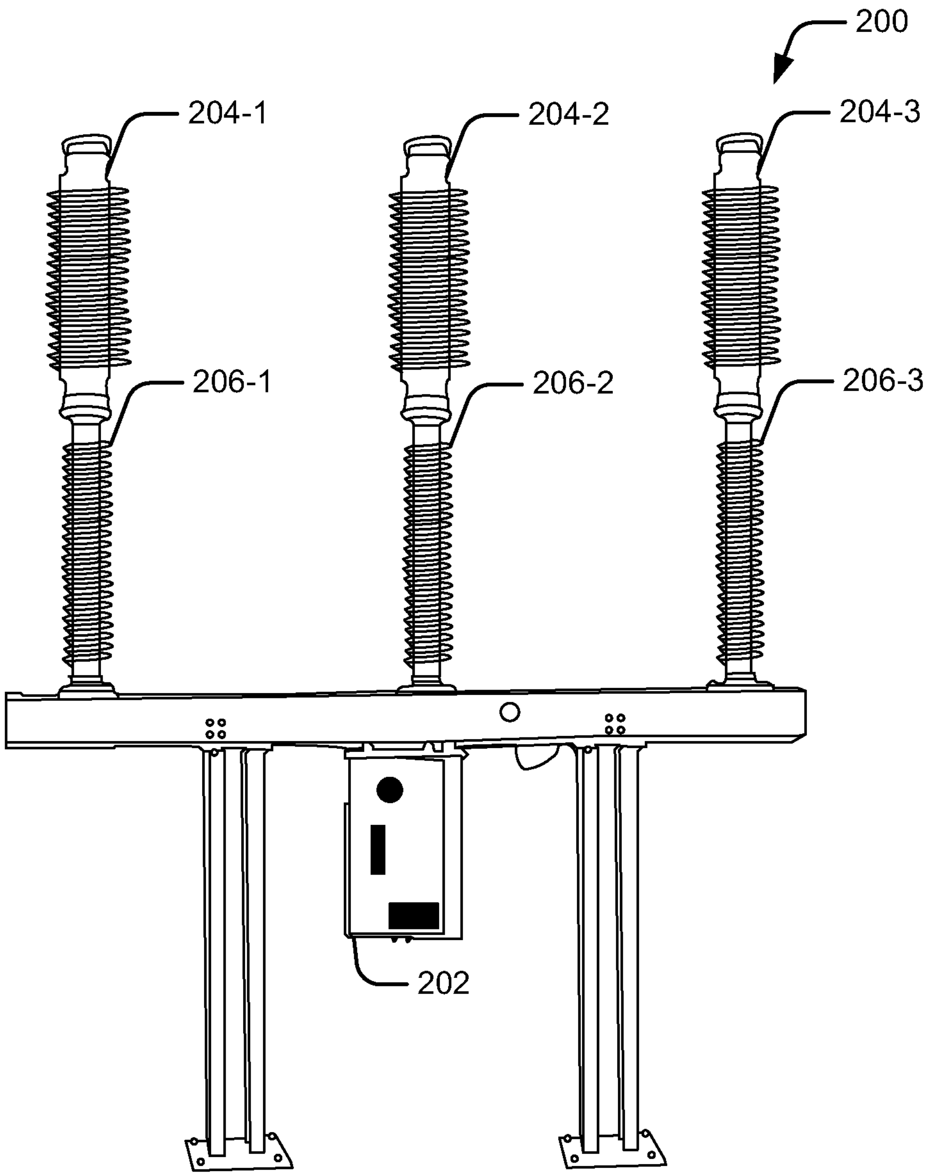
FIG. 2 illustrates a circuit breaker, as per an example.

FIG. 2 illustrates an example of a circuit breaker 200. The circuit breaker 200 is a switching device that may be operated manually and/or automatically for controlling and protecting an electrical power system (such as the power system 100). In an example, the circuit breaker 200 includes fixed contacts and moving contacts (not shown in FIG. 2). In an example, the circuit breaker may be a self-blast type SF6 breaker (LTB). Moreover, a rating of the LTB may be in a range of about 72 kilovolts (kV) to 800 kV.

The circuit breaker 200 may include breaker chambers 204-1, 204-2, 204-3 (collectively referred to as breaker chambers 204). The breaker chambers 204 may include a medium for quenching formation of an electric arc. Typically, due to high fault current, electric arc may be formed between the moving contacts and the fixed contacts at a contact point when the contacts separate. To this end, arc quenching medium such as oil, vacuum, air, arc chute, magnetic coil, or sulphur hexafluoride, may be provided within the breaker chamber 204 to increase dielectric strength between the moving and the fixed contacts. In an example, the arc quenching medium used in the circuit breaker 200 may be sulphur hexafluoride (SF6).

The circuit breaker 200 further includes insulators 206-1, 206-2, 206-3. The insulators 206-1, 206-2, 206-3 (collectively referred to as insulators 206) may be hollow electrical insulators that provide insulating barrier between live electrical conductor (or power line) and metallic conducting body of the circuit breaker 200 that may at ground potential. The insulators 206 allow the electrical conductor to pass safely through a conducting barrier.

Under normal operating condition of the power system 100, the fixed contacts and the moving contacts may be physically connected to each other due to applied mechanical pressure on the moving contacts. During a fault, high fault current may flow through a faulty power line (such as the power line 104). In an example, a protection device, such as a relay, an instrument transformer, or a sensor, may detect the high fault current. For example, the fault may be a short circuit fault, an overcurrent fault, an overvoltage fault, or an electrical cable fault.

On detecting high fault current in the power line 104, an IED (such as the IED 102) may send an opening signal to the circuit breaker 200. In particular, the circuit breaker 200 may be operated using an operating mechanism 202. On receiving the opening signal, the operating mechanism 202 of the circuit breaker 200 may be triggered to release potential energy. The potential energy may be stored in the circuit breaker 200 by way of, for example, a metal spring, compressed air, or hydraulic pressure. In particular, the potential energy for the circuit breaker 200 may be stored within an opening spring system (not shown in FIG. 2) and a closing spring system (not shown in FIG. 2). Further, the release of the potential energy of the opening spring system causes sliding of the moving contacts of the circuit breaker 200 in a speedy manner Subsequently, the moving contacts loses physical contact with the fixed contact and the power line 104 may be isolated. During the opening operation, an electrical arc may be formed between the moving contacts and the fixed contacts, that may be quenched by the quenching medium in the breaker chambers 204.

Once the electrical fault is cleared, the circuit breaker 200 is to be closed for bringing the power system 100 to normal working condition. During a closing operation of the circuit breaker 200, the moving contacts and the fixed contacts are brought back in contact to resume normal operation of the power system 100. For this, potential energy stored in the closing spring system may be released to move the moving contacts to engage with the fixed contact. Moreover, potential energy of the opening spring system may be restored during the closing operation of the circuit breaker 200.

As would be understood, the operating mechanism 202 of the circuit breaker 200 may include other components. Examples of such components include, but are not limited to, motor, worm gear, auxiliary contacts, counter, position indicator, spring charge indicator, manual closing operation lever, manual opening operation lever, trip coil, closing coil, latches and electrical wirings. Such components are not described in detail for the sake of brevity. The operating mechanism 202 of the present subject matter is explained in detail with the following figures.

Figure 3:
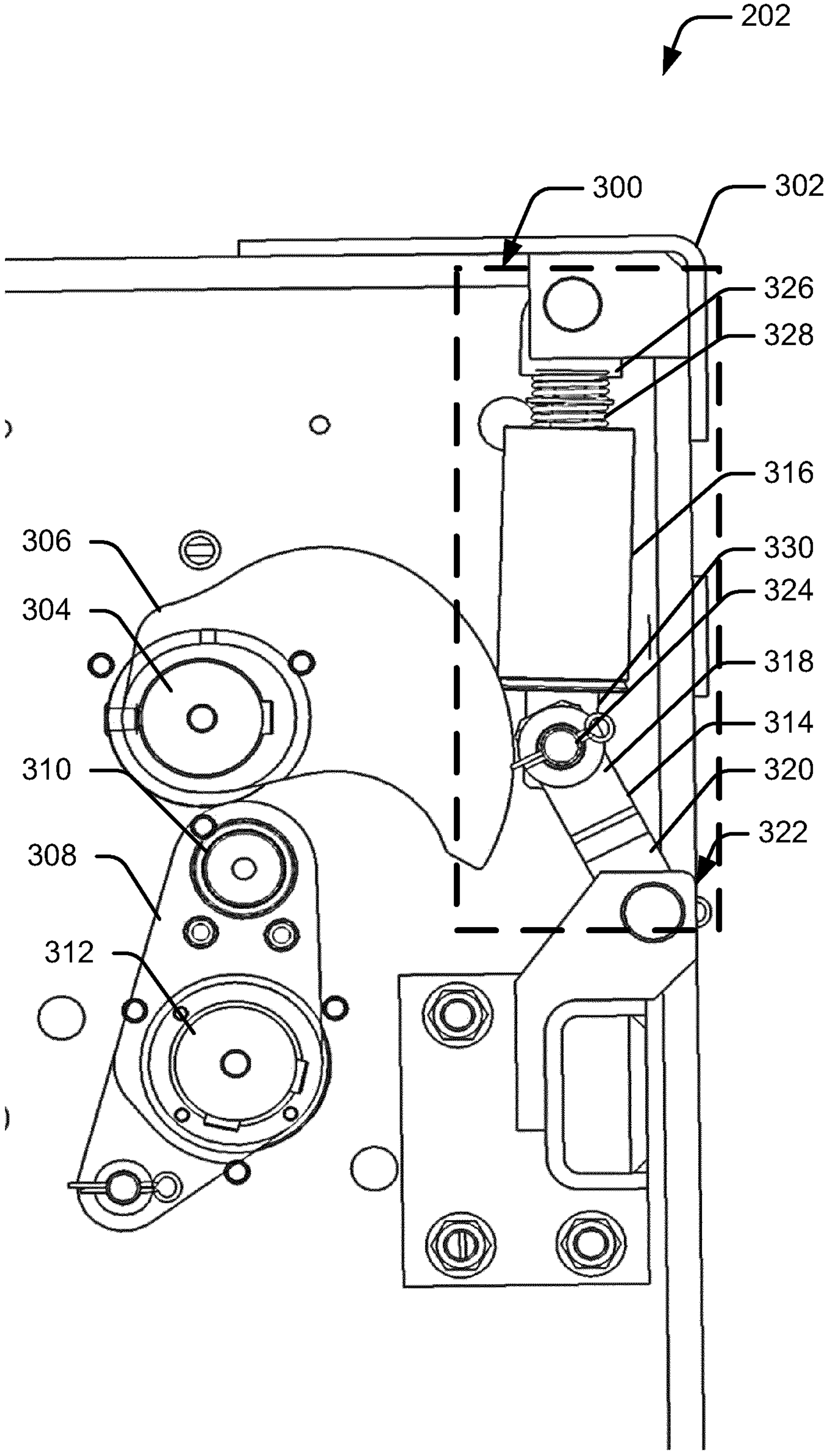
FIG. 3 illustrates an operating mechanism of a circuit breaker, as per an example.

FIG. 3 illustrates an exemplary operating mechanism 202 of a circuit breaker. The operating mechanism 202 of the circuit breaker (such as the circuit breaker 200) may open the circuit breaker 200 to isolate a faulty electrical circuit (such as the faulty power line 104) during an electrical fault. Thereafter, upon the clearance of the electrical fault, the operating mechanism 202 may close the circuit breaker 200 to resume normal operation of the power line 104 in a power system 100.

The operating mechanism 202 includes a support assembly 300 for providing damping mechanism provided within a housing 302. The housing 302 may provide protective enclosures to the components of the operating mechanism 202. The operating mechanism includes a first shaft 304. The first shaft 304 may be a tubular splined shaft extending longitudinally along an axial plane of the housing 302. The first shaft 304 may be coupled to a closing spring system near a first end of the first shaft 304. The closing spring system 302 may include a plurality of closing springs arranged in parallel to each other. In an example, an intermediate fitting link may mechanically couple the closing spring system to the first shaft 304.

The operating mechanism 202 includes a cam element 306 positioned within the housing 302. The cam element 306 may be installed on the first shaft 304. For example, the cam element 306 may be provided at a central vertical axis of the first shaft 304. The cam element 306 may have a flat body extending perpendicular to a longitudinal axis of the first shaft 304. The cam element 306 may have a first end and a second end opposite to the first end. In particular, the first end of the cam element 306 may enclose a portion of the first shaft 304 while the second end of the cam element 306 may have an arc-shaped cam profile that is to engage with other components of the operating mechanism 202.

Further, the operating mechanism 202 includes a transmission lever 308. The transmission lever 308 is provided with a first roller element 310. In an example, the first roller element 310 is a bearing. The transmission lever 308 may be installed on a second shaft 312 that extends parallel to the first shaft 304. The second shaft 312 may be a tubular splined shaft extending longitudinally along an axial plane of the housing 302, within a same axial plane as the first shaft 304. The second shaft 312 may be mechanically driven to open or close the circuit breaker 200. In particular, the second shaft 312 may be coupled to a moving contact (not shown in FIG. 3) of the circuit breaker 200, that when rotated, may physically separate or interact with a fixed contact (not shown in FIG. 3) of the circuit breaker 200.

It may be noted that the second shaft 312 may also be coupled to an opening spring system (not shown in FIG. 3) near a first end of the second shaft 312. The opening spring system may include a plurality of opening springs arranged in parallel to each other. The first end of the second shaft 312 may be substantially opposite to the first end of the first shaft 304.

Continuing further, the operating mechanism 202 includes a support assembly 300. The support assembly 300 includes a fork joint 314 and a damper element 316. The support assembly 300 may provide additional damping force to the circuit breaker 200 by absorbing excess energy released during the operation of the circuit breaker 200.

The fork joint 314 has a moveable end 318 and a pivoted end 320. The pivoted end 320 may be coupled to an inner surface of a vertical wall 322 of the housing 302. For example, the closing spring system may be provided external to the vertical wall 322. As would be understood, the opening spring system may be provided external to a vertical wall (not shown in FIG. 3) that is opposite to the vertical wall 322. The moveable end 318 of the fork joint 314 may have three prongs, wherein respective first side of the three prongs may be connected. The three prongs may diverge from the first side to form a first slot and a second slot. To this end, the moveable end 318 of the fork joint 314 may have a fork-shape.

In addition, each of the three prongs of the moveable end 318 may be provided with an opening. In particular, the opening on each of the three prongs may be along same axis. Moreover, a fork pin 324 may be inserted through the openings on the three prongs. Specifically, the moveable end 318 of the fork joint 314 is to support a second roller element (not shown in FIG. 3). In this regard, the second roller element may be supported by the fork pin 324 such that the second roller element is rotatably secured within the first slot of the moveable end 318. In an example, the second roller element may enclose a portion of the fork pin 324 that extends within the first slot of the moveable end 318 of the fork joint 314.

Further, the damper element 316 may include a piston or a valve for regulating flow of fluid. The damper element 316 may have a first end 326 that is rigidly pivoted on an upper horizontal surface of the housing 302 of the circuit breaker 200, via a damper spring 328. Moreover, a second end 330 of the damper element 316 is coupled to the moveable end 318 of the fork joint 314. In particular, the second end 330 of the damper element 316 may be supported by the fork pin 324 such that the second end 330 is movably secured within the second slot of the moveable end 318. The damper element 316 is explained in detail with regard to FIG. 4.

Figure 4:
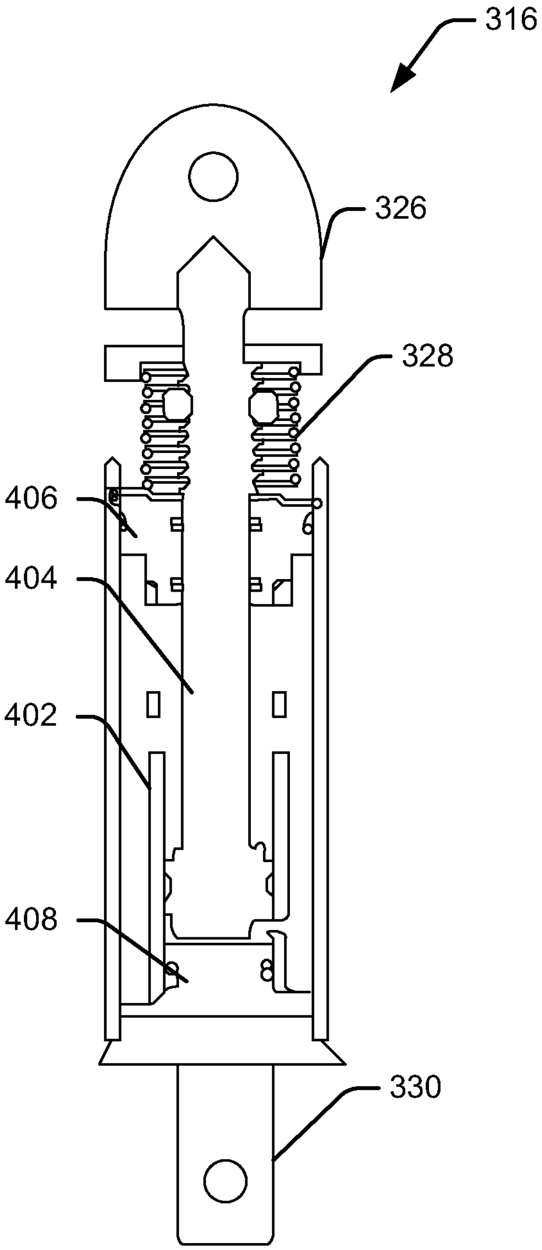
FIG. 4 illustrates a damper element, as per an example.

FIG. 4 illustrates an exemplary damper element 316. The damper element 316 may be a cylindrical structure having a perforated tube 402. The damper element 316 may have a metallic body. Moreover, the damper element 316 may include a longitudinally displaceable piston 404. The piston 404 may be provided within the perforated tube 402 and may move inside the perforated tube 402. Moreover, the damper element 316 may be filled with a damping fluid or an arc quenching medium, for example, oil, air, or sulphur hexafluoride. In particular, movement of the piston 404 is to cause restricted flow of the damping fluid during closing of the circuit breaker 200.

The damper element 316 is provided with a first guide ring 406 and a second guide ring 408. The first guide ring 406 and the second guide ring 408 may act as a guide for the piston 404 and prevent direct metallic contact of the piston 404 with the cylinder body of the damper element 316. The first guide ring 406 and the second guide ring 408 may be kept in place using a circlip. Further, the first guide ring 406 and the second guide ring 408 may be provided with internal and external sealing to prevent leakage of the retarding fluid.

The first guide ring 406 may also support a lower end of a damper spring, such as the damper spring 328.

The movement of the piston 404 within the perforated tube 402 may cause restricted flow of the damping fluid through holes on the perforated tube 402. Moreover, the piston 404 may operate in reverse direction to prevent spill over of the retarding fluid. The first and the second guide ring 406 and 408 may optimize position of the piston 404 such as to prevent the piston 404 from hitting dead center position, for example, at first end or second end.

Returning to FIG. 3, the operating mechanism 202 may be triggered for an opening operation on occurrence of an electrical fault on the power line 104. During the opening operation of the circuit breaker 200, the opening spring system coupled to the second shaft 312 may be released. Due to the release of the opening springs of the opening spring system, the second shaft 312 may be rotated, thereby physically separating the moving contact from the fixed contact of the circuit breaker 200.

When the electrical fault on the power line 104 is cleared, a closing operation of the circuit breaker 200 may be initiated. During the closing operation, the closing springs may be released. Due to the release of the closing springs, the first shaft 304 may be rotated thereby engaging the cam element 306 on the first shaft 304 with the first roller element 310 on the transmission lever 308. In particular, the cam profile of the cam element 306 may engage with the first roller element 310 to push the transmission lever 308. As a result, the second shaft 312 may move the moving contact to interact with the fixed contact thereby closing the circuit breaker 200.

Pursuant to present subject matter, during the closing operation of the circuit breaker 200, the support assembly 300 initiates a closing damper stroke. In particular, the cam element 306 is rotated further to cause the cam element 306 to move away from the first roller element 310 and to engage with the second roller element on the fork joint 314 to initiate the closing damper stroke. As the cam profile of the cam element 306 engages with the second roller element, the cam element 306 may exert force on the damper element 316 to result in contraction of the damper element 316. This may move the damper element 316 in a plane which is laterally offset from a plane of rotation of the cam element 306. Moreover, as the damper element 316 moves, the piston 404 of the damper element 316 may also move to cause flow of the damping fluid during the closing operation of the circuit breaker 200. The damper element 316 is brought in contact with the second roller element for starting the closing damper stroke when the cam element 306 is to rotate, for engaging with the first roller element 310, without any interference with the damper element 316.

In the present example, a damping force provided by the support assembly 300 at a start of the closing damping stroke may be less than a peak damping force. Once the contact between the cam element 306 and the first roller element 310 is disengaged, full damping starts to provide the peak damping force and brings the closing springs slowly to rest. The slow deceleration of the closing springs results in the low stress on the closing springs. This improves the robustness of the closing springs.

At an end of the closing damper stroke, the damper element 316 remains in the closed state. Moreover, while the closing springs are charged, the second roller element on the fork joint 314 gets disengaged from the cam element 306. In addition, the damper spring 328 attached to the damper element 316 retracts the damper element 316 and the fork joint 314 to an initial state and ready for the next operation.

The support assembly 300 including the fork joint 314 and the damper element 316 provides damper to the closing springs during the closing operation of the circuit breaker 200 thereby enabling smooth operation of the closing springs and thus the circuit breaker. Due to less stress on the closing springs, the closing springs having less elasticity may be used. In addition, performance of the closing springs is enhanced as less restoring torque may be required from the closing springs.

It may be noted that the damper element 316 may be spaced apart from the cam element 306. Moreover, the damper element 316 is brought into action such as to avoid impact on the closing operation or the rotation of the cam element 306 when engaging with the first roller element 310. Moreover, the support assembly 300 is accommodated to fit within the compact housing 302 to enhance the closing operation and improve the reliability of the circuit breaker 200. Furthermore, with the addition of the support assembly 300, impact between spring coils in the closing springs is prevented, resulting in higher endurance performance of the closing springs.

Figure 5:
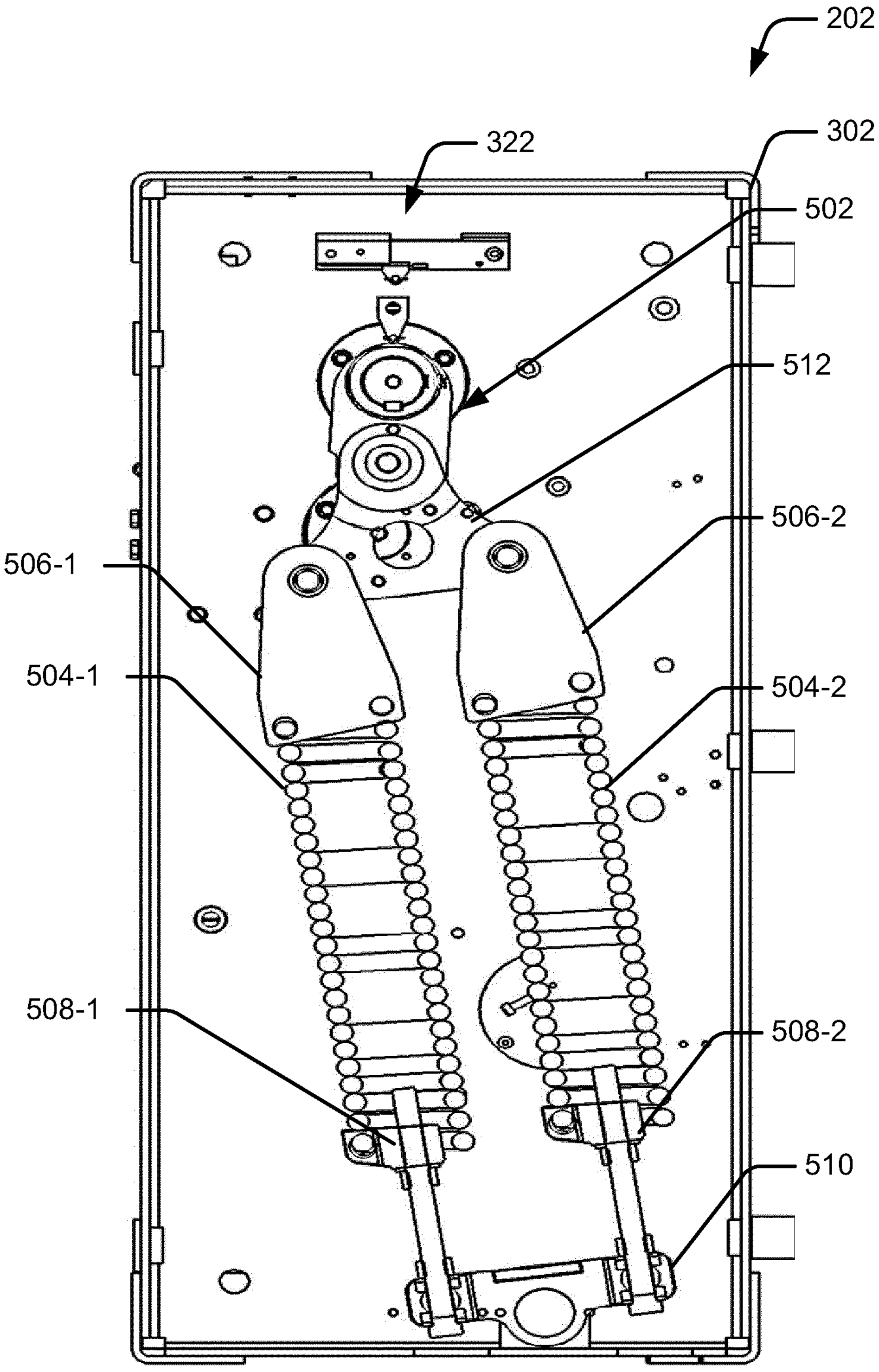
FIG. 5 illustrates a closing spring system of an operating mechanism of a circuit breaker, as per an example.

FIG. 5 illustrates an exemplary closing spring system 502 of an operating mechanism 202. The operating mechanism 202 may include a housing 302. The housing 302 may form an enclosure for the components of the operating mechanism 202. The housing 302 may be a metallic cuboidal structure. In an example, the housing 302 may be made of aluminium. Moreover, the housing 302 may be painted to avoid corrosion. The housing 302 may have a door, for example, at a longitudinal side of the housing. The door may include doorstops, door handles, and padlock on door handles.

The operating mechanism 202 includes the closing spring system 502. In particular, the closing spring system 502 includes a plurality of closing springs (depicted as closing springs 504-1 and 504-2). The closing springs 504-1 and 504-2 are located external to the housing 302, for example, on a vertical wall (such as the vertical wall 322) adjacent to the door. The closing springs 504-1 and 504-2 are arranged in parallel to each other. It may be noted that the closing springs system 502 to include two closing springs 504-1 and 504-2 is only illustrative and should not be construed as limiting. In other examples of the present subject matter, the closing spring system 502 may include a single closing spring or more than two closing springs arranged in parallel to each other.

Each of the closing springs 504-1 and 504-2 of the closing spring system 502 may have a first end and a second end. At the first end of the closing springs 504-1 and 504-2, first end fittings 506-1 and 506-2, respectively, are provided. In addition, at the second end of the closing springs 504-1 and 504-2, second end fittings 508-1 and 508-2, respectively, are provided. The first end fitting 506-1 and 506-2, and the second end fittings 508-1 and 508-2 may mechanically couple the first ends and the second end, respectively, to the housing 302. In certain cases, the first end fitting 506-1 and 506-2, and the second end fittings 508-1 and 508-2 may mechanically couple the first ends and the second end, respectively, to other components of the operating mechanism 202 or a circuit breaker 200.

In an example, the closing spring system 502 may include a moveable arm 510. In particular, the second end of the closing springs 504-1 and 504-2 may be coupled to the moveable arm 510, wherein the moveable arm 510 is further installed on the housing 302. The closing spring system 502 may also include a retainer plate (not shown in FIG. 5) to prevent movement of the moveable arm 510 in an outward direction. In particular, the retainer plate may extend from a base of the housing 302, parallel to the moveable arm 510. For example, due to the moveable arm 510, the release of the closing springs 504-1 and 504-2 may not be limited along a longitudinal direction. The movable arm 510 may cause oscillation of the closing springs 504-1 and 504-2 between corresponding extreme left and extreme right position, depicted in FIG. 5 as dotted lines. This may provide greater surface area for release of the closing springs 504-1 and 504-2.

Moreover, the first end of the closing springs may be coupled to the housing 302 by way of an intermediate fitting link 512. In an example, the intermediate fitting link 512 may be coupled to a first shaft (such as the first shaft 304) of the operating mechanism 202. The first shaft 304 may also be coupled to an opening spring system (not shown in FIG. 5), wherein the first shaft 304 may be rotated for closing the circuit breaker 200. It may be noted that a number of fastening means may be used for installing the closing springs 504-1 and 504-2 and the moveable arm 510 on the housing 302. Examples of the fastening means include, but are not limited to, studs, pins, bolts, bearings, and screws. For example, bolt connections may be used for installing or rigidly coupling a component within the housing 302 or on the housing 302, instead of weld connection that may introduce possible distortions due to weld lines.

The operating mechanism 202 further includes an opening spring system (not shown in FIG. 3). The opening spring system may include a plurality of opening springs provided external to the housing 302, for example, on a vertical wall adjacent to the door and opposite to the vertical wall 322 with the closing spring system 502. During an opening operation of the circuit breaker 200, the plurality of opening springs may be released to isolate the faulty power line 104.

During a closing operation of the circuit breaker 200, the closing springs 504-1 and 504-2 may be released. For example, the circuit breaker may operate at high rated voltage, such as above 170 kV. In such a case, the closing springs 504-1 and 504-2 may be released with high energy and high speed. The closing springs 504-1 and 504-2 are separated and may operate independently for closing the circuit breaker 200. Since the working torque for closing of the circuit breaker is provided by the plurality of closing springs, i.e., the closing springs 504-1 and 504-2, stress on a single spring is reduced.

Although, the plurality of closing springs in parallel may eliminate high stress on single spring, however, the closing springs may still be subjected to high stress during the closing operation of high energy breakers or high rating LTB. In particular, in circuit breakers used in high voltage application, such as at 170 kV or higher, the plurality of closing springs may fail to effectively provide adequate damping force. During operation in high energy environment, travel characteristics and endurance of the plurality of closing springs may be affected. This may reduce a number of operations or M2+ characteristic that may be required from the plurality of closing springs.

To this end, a support assembly (such as the support assembly 300) within the operating mechanism 202 is provided for the circuit breaker 200 that provides adequate damping force, improves reliability of the circuit breaker, and reduces redundancy of closing springs of the circuit breaker. The support assembly 300 may provide damper to the closing springs 504-1 and 504-2. In this regard, the support assembly 300 may cause the closing springs 504-1 and 504-2 to decelerate thereby slowly bringing the closing springs 504-1 and 504-2 to rest. This may further decrease the stress on the closing springs 504-1 and 504-2. Therefore, use of plurality of closing springs 504-1 and 504-2 and the support assembly 300 may eliminate frequent redundancy of the closing springs 504-1 and 504-2. This may further improve robustness of the circuit breaker to 200 to satisfy IEC standard for M2 performance, to perform more than 10000 operations, of the closing springs 504-1 and 504-2. Moreover, the moveable arm 510 may introduce one or more degree of freedom by enabling rocking or oscillatory motion of the closing springs 504-1 and 504-2. This may further reduce stress on the closing springs 504-1 and 504-2.

Figure 6:
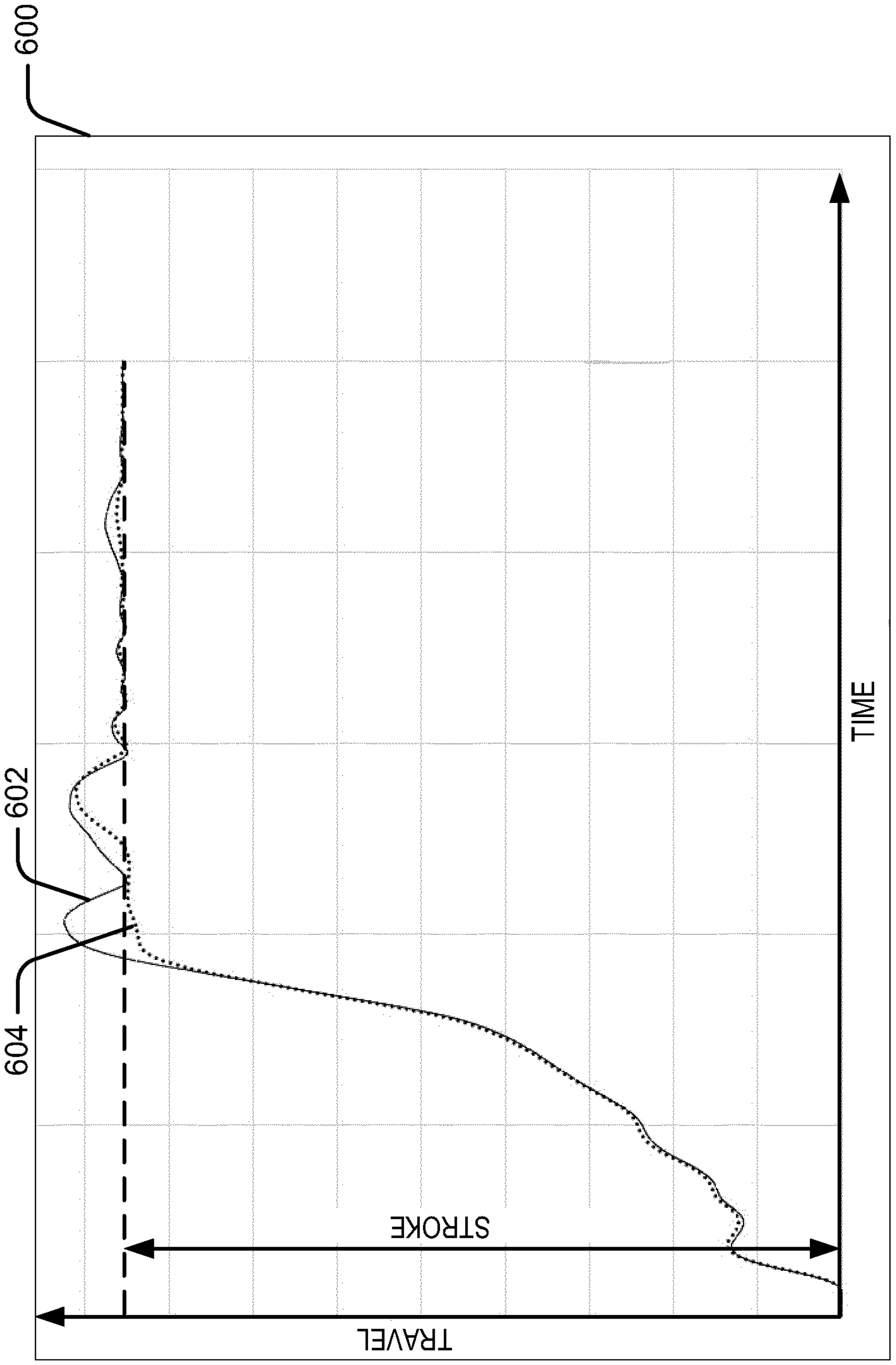
FIG. 6 illustrates a graph depicting an operating characteristics of a circuit breaker, as per an example.

FIG. 6 illustrates a graph 600 depicting an operating characteristic of a circuit breaker, as per an example. In particular, the graph 600 is a time-travel characteristic graph for an operating mechanism 202 of the circuit breaker 200. As would be understood, the time-travel characteristic graph 600 may depict operating characteristics or performance of the circuit breaker 200. In particular, the time-travel characteristic graph 600 illustrates an effect of the support assembly 300 on operating characteristics during a closing operation of the circuit breaker 200.

The graph 600 is a plot of time, along X-axis, against travel, along Y-axis. In an example, a transducer may be connected to the circuit breaker 200 to determine travel of contacts, i.e., moving contact and fixed contact, of the circuit breaker 200 with respect to time. In particular, the transducer may detect a stroke which is defined as the total travel distance of contacts, from resting position in one state (e.g., opened) to the resting position in the other state (e.g., closed). By observing closing time along with travel measurement, other parameters, such as penetration, overtravel, and rebound may be determined. Based on the stroke, penetration, overtravel and rebound of the circuit breaker 200, the graph 600 may be plotted.

Time-travel characteristics of the circuit breaker 200 without the support assembly 300 is depicted using non-dotted line 602 while time-travel characteristics of the circuit breaker 200 provided with the support assembly 300 is depicted using dotted line 604. In particular, a damper element (such as damper element 316) of the support assembly 300 operates to cause damping of the cam element (such as the cam element 306) of the circuit breaker 200. To this end, the damper element 316 initiates closing damper stroke to provide damping to the cam element 306 after the cam element 306 disengages completely with a transmission lever (such as transmission lever 308) of the circuit breaker. In this manner, the damper element or the support assembly does not affect the travel characteristics of the cam element.

As may be concluded from the graph 600, travel measurements of the circuit breaker 200 without the support assembly 300 is higher as compared to travel measurements of the circuit breaker 200 using the support assembly 300. It may further be concluded that impact or stress experienced by closing springs 504-1 and 504-2 of the circuit breaker 200 without the support assembly 300 is for higher duration as compared to impact or stress experienced by closing springs 504-1 and 504-2 of the circuit breaker 200 with the support assembly 300. Therefore, it may be concluded that the support assembly 300, including the fork joint 314 and the damper element 316, may considerably improve the endurance of the closing springs 504-1 and 504-2. As a result, early failure of the closing springs, for example, before 10000 operations, may be prevented thereby enhancing reliability of the circuit breaker. This may reduce a number of maintenance cycles of the circuit breaker, thus making is cost-effective. Moreover, strong closing springs may not be required, thus further reducing costs associated with the circuit breaker. As the support assembly can be accommodated within compact housing of existing operating mechanism, an overall size of the operating mechanism is not affected.

In an example, the present subject matter also provides a method for performing a closing operation of a circuit breaker (such as the circuit breaker 200). In particular, the method for performing the closing operation of the circuit breaker 200 is implemented by an operating mechanism 202 of the circuit breaker 200. In an example, the circuit breaker 200 may be a SF6 type circuit breaker having self-blast design, referred to as Live Tank Breaker (LTB). In the present example, the method is described with respect to the circuit breaker 200 and the operating mechanism 202. However, such implementation of the method should not be construed as limiting in any way. In other examples, the method may be implemented by different operating mechanism of another type of circuit breakers.

The method for performing the closing operation of the circuit breaker 200 comprises rotating a cam element to interact with a first roller element to cause rotation of a transmission lever to close the circuit breaker. In particular, the cam element 306 and the transmission lever 308 are positioned within a housing 302 of the operating mechanism 202. The cam element 306 is installed on a mechanically driven first shaft 304 of the operating mechanism 202. Moreover, the transmission lever 308 is installed on a second shaft 312 of the operating mechanism 202 that is parallel to the first shaft 304. The transmission lever 308 is provided with the first roller element 310. In an example, the first shaft 304 may further be coupled to a closing spring system 502 while the second shaft 312 may further be coupled to an opening spring system or tripping spring system. To such an end, the rotation of the cam element 306 causes the cam element 306 to engage with the first roller element 310 of the transmission lever 308 to close the circuit breaker 200.

The method further comprises rotating the cam element further to cause the cam element to move away from the first roller element and to engage with a second roller element on a fork joint of a support assembly to initiate a closing damper stroke. As described previously, the operating mechanism 202 further comprises a support assembly 300 that may be coupled to an inner surface of a vertical wall 322 of the housing 302. The support assembly 300 comprises the fork joint 314 and a damper element 316. The fork joint 314 may have a moveable end 318 and a pivoted end 320. The moveable end 318 may have at least three progs that may form a first slot and a second slot, such as a fork-shape. Moreover, the moveable end 318 may support the second roller element, such as within the first slot. Furthermore, the damper element 316 may have a first end 326 that is rigidly pivoted on an upper horizontal surface of the housing 302, and a second end 330 that is coupled to the moveable end 318 of the fork joint 314, such as within the second slot of the movable end 318.

To such an end, the cam element 306, when rotated further, may engage with the second roller element on the fork joint 314 to provide damping to the cam element 306 during the closing operation of the circuit breaker 200. It may be noted that the damping element 316 operates to provide damping after the cam element 306 disengages completely with the first roller element 310 of the transmission lever 308. In this manner, travel characteristics of the cam element 306 is not affected by the operation of the damper element 316.

Although implementations of present subject matter have been described in language specific to structural features and/or methods, it is to be noted that the present subject matter is not necessarily limited to the specific features or methods described. Rather, the specific features and methods are disclosed and explained in the context of a few implementations for the present subject matter.

We claim:

1. An operating mechanism of a circuit breaker comprising:
- a housing;
- a cam element positioned within the housing, wherein the cam element is installed on a mechanically driven first shaft;
- a transmission lever provided with a first roller element, wherein the transmission lever is installed on a second shaft such that the second shaft is parallel to the first shaft; and
- a support assembly coupled to an inner surface of a vertical wall of the housing, wherein the support assembly comprises:
  - a fork joint having a moveable end and a pivoted end, with the moveable end is to support a second roller element; and
  - a damper element having a first end and a second end, wherein the first end of the damper element is rigidly pivoted on an upper horizontal surface of the housing of the circuit breaker, and the second end of the damper element is coupled to the moveable end of the fork joint.

2. The operating mechanism of claim 1, wherein during a closing operation of the circuit breaker, the cam element is configured to:
- rotate to interact with the first roller element to cause rotation of the transmission lever to close the circuit breaker; and
- further rotate to cause the cam element to move away from the first roller element and to engage with the second roller element on the fork joint to initiate a closing damper stroke.

3. The operating mechanism of claim 1, wherein the damper element comprises a longitudinally displaceable piston that is to cause restricted flow of a damping fluid during the closing damper stroke.

4. The operating mechanism of claim 2, wherein a cam profile of the cam element is to engage with the first roller element during the closing operation of the circuit breaker.

5. The operating mechanism of claim 2, wherein a cam profile of the cam element is to engage with the second roller element of fork joint to initiate the closing damper stroke, and wherein the damper element is to provide damping to the cam element after the cam element has completely disengaged with the first roller element.

6. The operating mechanism of claim 1, wherein the damper element is to move in a plane which is laterally offset from a plane of rotation of the cam element, such that the cam element is to rotate without any interference with the damper element.

7. The operating mechanism of claim 1, wherein the fork joint comprises a first slot and a second slot, wherein the first slot is to rotatably secure the second roller element and the second slot is to receive the second end of the damper element.

8. The operating mechanism of claim 1, wherein the cam element when engaging with the second roller element, is to exert force on the damper element to result in contraction of the damper element.

9. The operating mechanism of claim 1, wherein the first shaft is coupled to a closing spring system comprising a plurality of closing springs which are arranged in parallel to each other.

10. The operating mechanism of claim 1, wherein the circuit breaker has a rating in a range of about 72 kilovolts (kV) to 800 kV.

11. The operating mechanism of claim 1, wherein the circuit breaker is a sulphur hexafluoride circuit breaker.

12. A circuit breaker comprising an operating mechanism, the operating mechanism comprising:

a housing;

a cam element positioned within the housing, wherein the cam element is installed on a mechanically driven first shaft;

a transmission lever provided with a first roller element, wherein the transmission lever is installed on a second shaft such that the second shaft is parallel to the first shaft; and a support assembly coupled to an inner surface of a vertical wall of the housing, wherein the support assembly comprises:

a fork joint having a moveable end and a pivoted end, with the moveable end is to support a second roller element; and a damper element having a first end and a second end, wherein the first end of the damper element is rigidly pivoted on an upper horizontal surface of the housing of the circuit breaker, and the second end of the damper element is coupled to the moveable end of the fork joint.

13. The circuit breaker of claim 12, wherein during a closing operation of the circuit breaker, the cam element is configured to:

rotate to interact with the first roller element to cause rotation of the transmission lever to close the circuit breaker; and further rotate to cause the cam element to move away from the first roller element and to engage with the second roller element on the fork joint to initiate a closing damper stroke.

14. The circuit breaker of claim 12, wherein the damper element is to move in a plane which is laterally offset from a plane of rotation of the cam element, such that the cam element is to rotate without any interference with the damper element.

15. The circuit breaker of claim 12, wherein the first shaft is coupled to a closing spring system comprising a plurality of closing springs which are arranged in parallel to each other.

16. The circuit breaker of claim 12, wherein the cam element when engaging with the second roller element, is to exert force on the damper element to result in contraction of the damper element, wherein the damper element comprises a longitudinally displaceable piston that is to cause restricted flow of a damping fluid during a closing damper stroke.

17. A method implemented by an operating mechanism of a circuit breaker, the method comprising:

rotating a cam element to interact with a first roller element to cause rotation of a transmission lever to close the circuit breaker, wherein the cam element is positioned within a housing of the operating mechanism and installed on a mechanically driven first shaft, and the transmission lever is provided with the first roller element, wherein the transmission lever is installed on a second shaft that is parallel to the first shaft; and rotating the cam element further to cause the cam element to move away from the first roller element and to engage with a second roller element on a fork joint of a support assembly to initiate a closing damper stroke, wherein the support assembly is coupled to an inner surface of a vertical wall of the housing, the support assembly comprising:

the fork joint having a moveable end and a pivoted end, where the moveable end is to support the second roller element; and a damper element having a first end and a second end, wherein the first end of the damper element is rigidly pivoted on an upper horizontal surface of the housing, and the second end of the damper element is coupled to the moveable end of the fork joint, and wherein the damper element provides the closing damper stroke.

18. The method of claim 17, wherein the fork joint comprises a first slot and a second slot, and wherein the method further comprises:

rotatably securing the second roller element within the first slot; and securing the second end of the damper element within the second slot.

19. The method of claim 17, further comprising exerting force, by the cam element when engaging with the second roller element, on the damper element to result in contraction of the damper element.

* * * * *